(12) United States Patent
Konno et al.

(10) Patent No.: US 6,914,516 B2
(45) Date of Patent: Jul. 5, 2005

(54) REMOTE LOCK CONTROL APPARATUS FOR SMALL VEHICLE

(75) Inventors: Takeshi Konno, Saitama (JP); Atsuo Ota, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 270 days.

(21) Appl. No.: 10/166,376

(22) Filed: Jun. 11, 2002

(65) Prior Publication Data

US 2002/0190843 A1 Dec. 19, 2002

(30) Foreign Application Priority Data

Jun. 18, 2001 (JP) ........................................ 2001-183722

(51) Int. Cl.[7] ............................................. G05B 19/00
(52) U.S. Cl. ................................... 340/5.64; 340/5.72
(58) Field of Search ............................ 340/5.64, 5.72, 340/5.31, 5.61, 426, 427, 455, 480; 180/287, 65.3; 307/10.3, 10.6; 123/179.1, 179.2

(56) References Cited

U.S. PATENT DOCUMENTS

| 5,343,077 A | 8/1994 | Yoshida et al. |
| 5,689,142 A | 11/1997 | Liu |

FOREIGN PATENT DOCUMENTS

| FR | 2 752 549 A1 | 2/1998 | | |
| FR | 2 753 666 A1 | 3/1998 | | |
| JP | 10054331 | * | 2/1998 | ............ F02N/3/04 |
| JP | 11227649 | * | 8/1999 | ............ B62H/5/00 |
| WO | WO 01/34439 A1 | 5/2001 | | |

* cited by examiner

Primary Examiner—Michael Horabik
Assistant Examiner—Matsuichiro Shimizu
(74) Attorney, Agent, or Firm—Birch, Stewart, Kolasch & Birch, LLP

(57) ABSTRACT

A remote lock control apparatus for unlocking of a locking mechanism for disabling running of a vehicle and allowing an engine of the vehicle to be started, when the power of the vehicle battery has been consumed. An ID code collation means successively executes a first step of performing collation of an ID code in response to operation of a kick starting mechanism for the first time and outputting, when the ID code exhibits coincidence, a collation coincidence signal to collation result holding means. This is followed by a second step of controlling operation of actuator driving means so that a handle lock mechanism may be placed into an unlocking state in response operation of the kick starting mechanism for the second time while the collation coincidence holding signal continues to be outputted from the collation result holding means and outputting a collation coincidence signal. Finally, a third step of controlling operation of main relay driving means so that a main relay may be placed into an on state in response to operation of the kick starting mechanism for the third time while the collation coincidence holding signal continues to be outputted from the collation result holding means.

11 Claims, 3 Drawing Sheets

REMOTE LOCK CONTROL APPARATUS FOR SMALL VEHICLE

CROSS-REFERENCE TO RELATED APPLICATIONS

The present application claims priority under 35 U.S.C. §119 to Japanese Patent Application No. 2001-183722 filed on Jun. 18, 2001, the entire contents thereof are hereby incorporated by reference.

BACKGROUND OF THE INVENTION

1. Field of the Invention

This invention relates to a small vehicle such as a motor-cycle or a motor tricycle, and more particularly to a remote lock control apparatus for a small vehicle which allows starting of the engine in response to transmission of a normal ID code from a portable transmitter.

2. Description of Background Art

A remote lock control apparatus, such as for preventing burglary, has already been put into practical use in a four-wheeled vehicle. In response to transmission of a normal ID code from a portable transmitter, this remote lock control apparatus is capable of canceling a locking state of a locking mechanism for disabling the running of a vehicle and placing a main relay provided between an ignition circuit of an engine and a battery into an on state to allow starting of the engine. Also, there has been consideration given to applying a remote lock control apparatus, such as just described, to a small vehicle such as a motorcycle.

However, in a small vehicle such as a motorcycle, the capacity of a battery carried is comparatively small, and as compared with a four-wheeled vehicle, there is a high possibility that the battery power may be consumed and that the battery may be dead. In a conventional small vehicle not having a remote lock control apparatus, the engine can be started by means of a kick starting mechanism, even when the battery is dead. However, in a small vehicle having a remote lock control apparatus, when the battery is dead, it becomes impossible to start the engine and to unlock of the locking mechanism for disabling running of the vehicle.

SUMMARY AND OBJECTS OF THEIR INVENTION

The present invention has been made in view of such a situation as described above. The object of the present invention is to provide a remote lock control apparatus for a small vehicle which allows starting of an engine and unlocking of a locking mechanism for disabling running of the vehicle in response to transmission of a normal ID code from a portable transmitter, even when battery power has been consumed.

In order to solve the above problem, according to the present invention, a remote lock control apparatus for a small vehicle is provided. The remote lock control apparatus includes a generator capable of charging a battery; a kick starting mechanism capable of driving the generator; and a main relay driving means capable of turning on and off a main relay provided between an ignition circuit of an engine and the battery Also included in the apparatus are actuator driving means for driving an actuator for changing over between locking and unlocking states of a locking mechanism for disabling running of the vehicle; a receiver for receiving a signal including an ID code and transmitted from a portable transmitter; a power supply circuit connected to the battery and the generator for allowing charging with electromotive force generated by the generator in response to operation of the kick starting mechanism.

Further included are ID code collation means operable in response to supply of power from the power supply circuit for executing collation of the ID code received by the receiver and a predetermined ID code and executing operation control of the main relay driving means and the actuator driving means in response to a result of the collation and outputting of a collation coincidence signal when the ID codes coincide with each other; and collation result holding means connected to the power supply circuit and the ID code collation means and capable of outputting a collation coincidence holding signal in response to outputting of the collation coincidence signal of the ID code collation means so as to continue for a preset time after stopping of the outputting of the collation coincidence signal of the ID code collation means caused by stopping of the power supply from the power supply circuit.

In the remote lock control apparatus of the present invention; the ID code collation means successively executes three steps as follows. A first step executes so as to perform collation of the ID codes in response to detection by the receiver of a signal from the portable transmitter within an operation enabled period of the ID code collation means in response to the power supply from the power supply circuit caused by driving of the generator by the kick starting mechanism for the first time and outputting, when the ID codes coincide with each other, a collation coincidence signal to the collation result holding means. Next, a second step executes a controlling operation of the actuator driving means so that the locking mechanism may be placed into the unlocking state in response to the power supply from the power supply circuit caused by the driving of the generator by the kick starting mechanism for the second time while the collation coincidence holding signal continues to be outputted from the collation result holding means and outputting a collation coincidence signal. Lastly, a third step executes a controlling operation of the main relay driving means, so that the main relay may be placed into an on state in response to the power supply from the power supply circuit caused by the driving of the generator by the kick starting mechanism for the third time while the collation coincidence holding signal continues to be outputted from the collation result holding means.

With the configuration described above, even when the vehicle battery is dead, an electromotive force generated by the generator by operating the kick starting mechanism can be provided to charge the power supply circuit. As a result of the charging the power supply circuit, operation of the ID code collation means is enabled.

Thus, when a signal from the portable transmitter is received by the receiver within a period within which the ID code collation means can operate as a result of the driving of the generator by the kick starting mechanism for the first time, the ID code collation means performs collation of the ID codes and outputs, when the ID codes coincide with each other, a collation coincidence signal to the collation result holding means. The collation result holding means inputs a collation coincidence holding signal, which continues for the preset time after the operation of the ID code collation means stops as a result of decrease of the charged power amount in the power supply circuit and the outputting of the collation coincidence signal is stopped, to the ID code collation means.

Then, when the generator is driven by the kick starting mechanism for the second time while the collation coincidence holding signal continues to be outputted from the collation result holding means, the ID code collation means places the locking mechanism into the unlocking state and outputs a collation coincidence signal. Consequently, a collation coincidence holding signal is outputted again from the collation result holding means.

Further, when the generator is driven by the kick starting mechanism for the third time while the collation coincidence holding signal continues to be outputted from the collation result holding means, operation of the main relay driving means is controlled, and thus the main relay may be placed into an on state. As a result, even when the battery power has been drained, if operation of the kick starting mechanism is performed three times within a comparatively short period of time corresponding to the preset time in the collation result holding means, then the locking mechanism can be placed into the unlocking state, and the engine can be started as a result of the ignition circuit being energized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention is described in detail below based on a working example of the present invention shown in the accompanying drawings.

Figure 1:
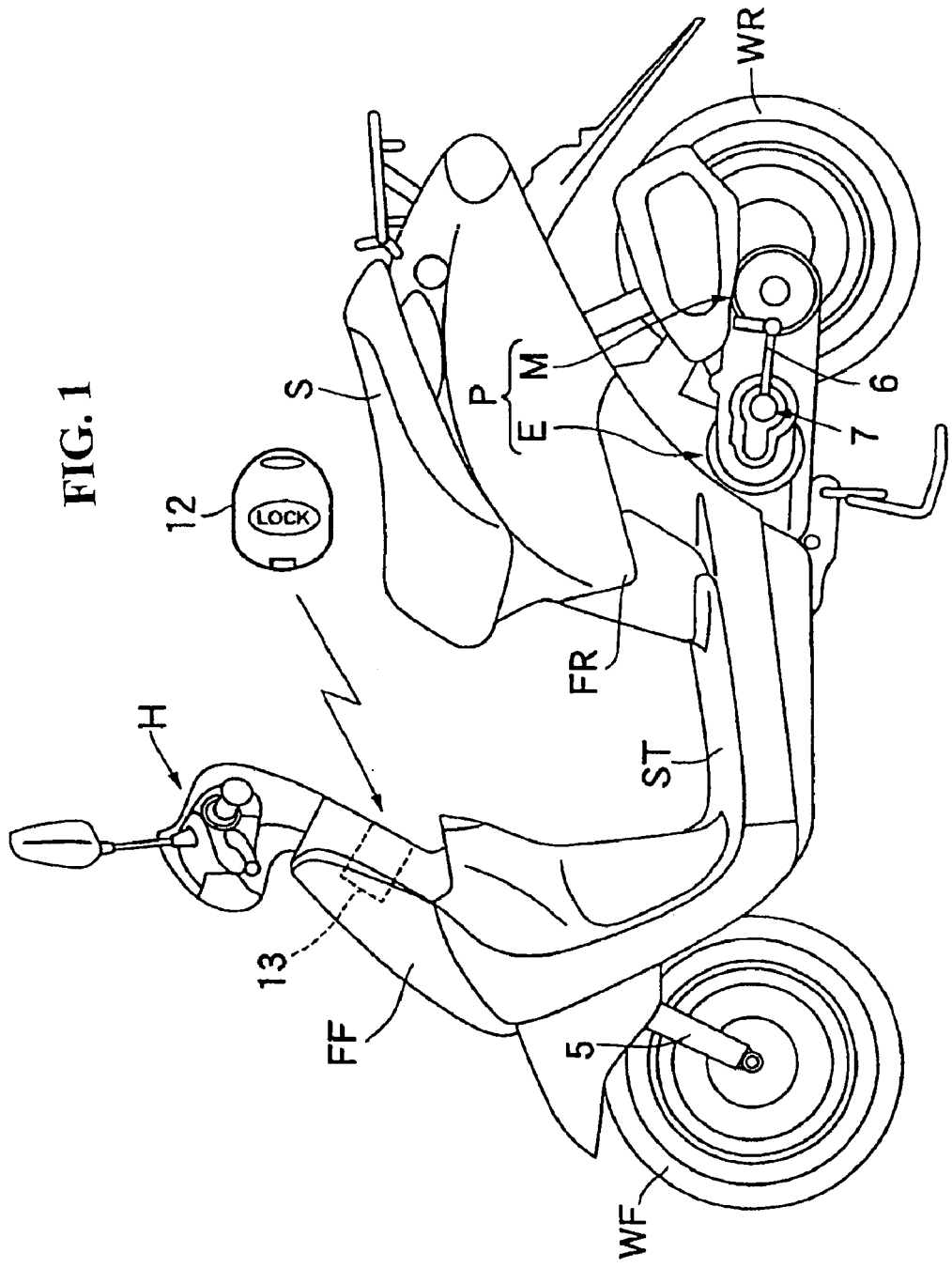
FIG. 1 is a side elevational view of a scooter.
Figure 2:
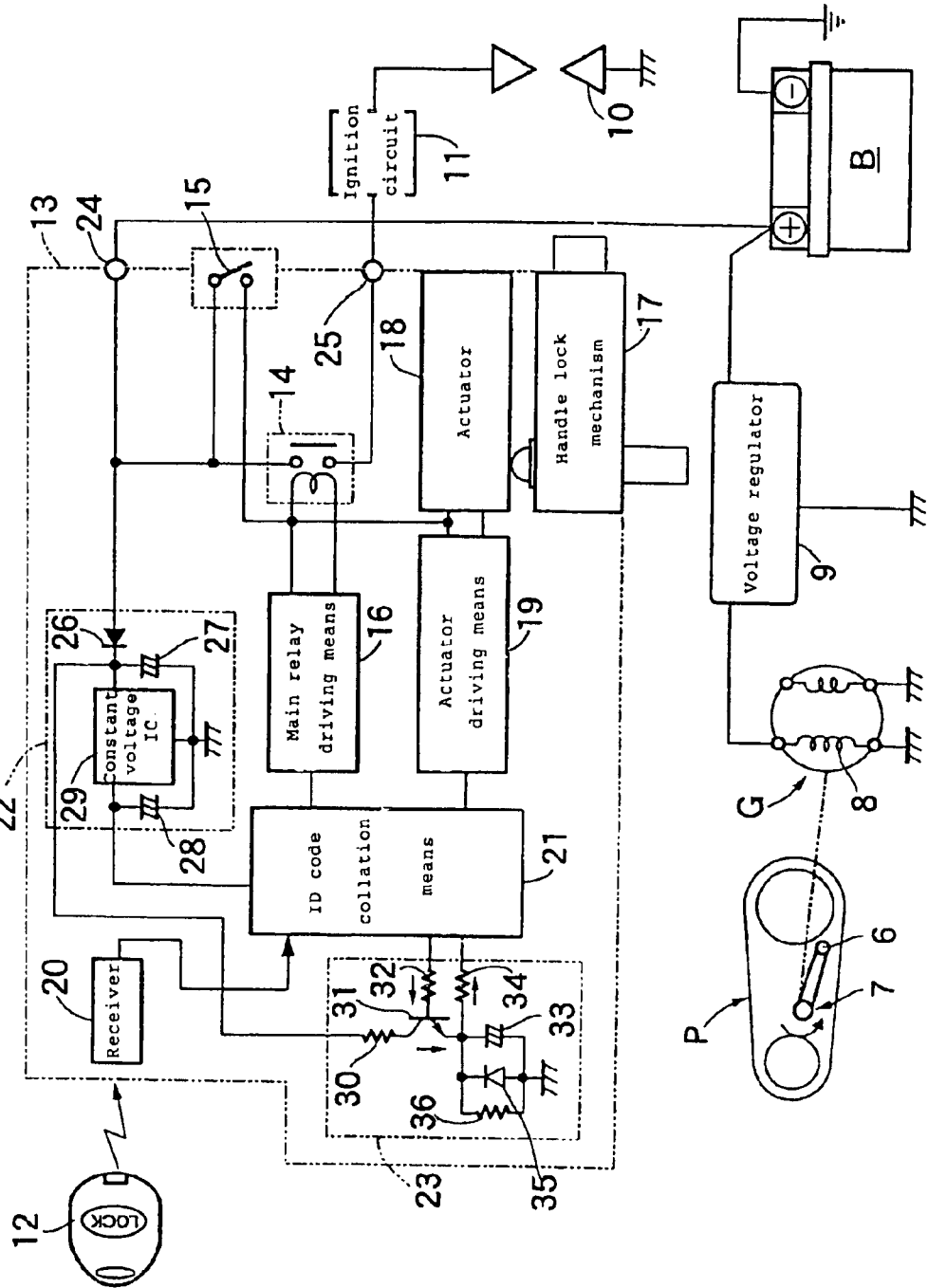
FIG. 2 is a circuit block diagram showing a configuration of a remote lock control apparatus.
Figure 3:
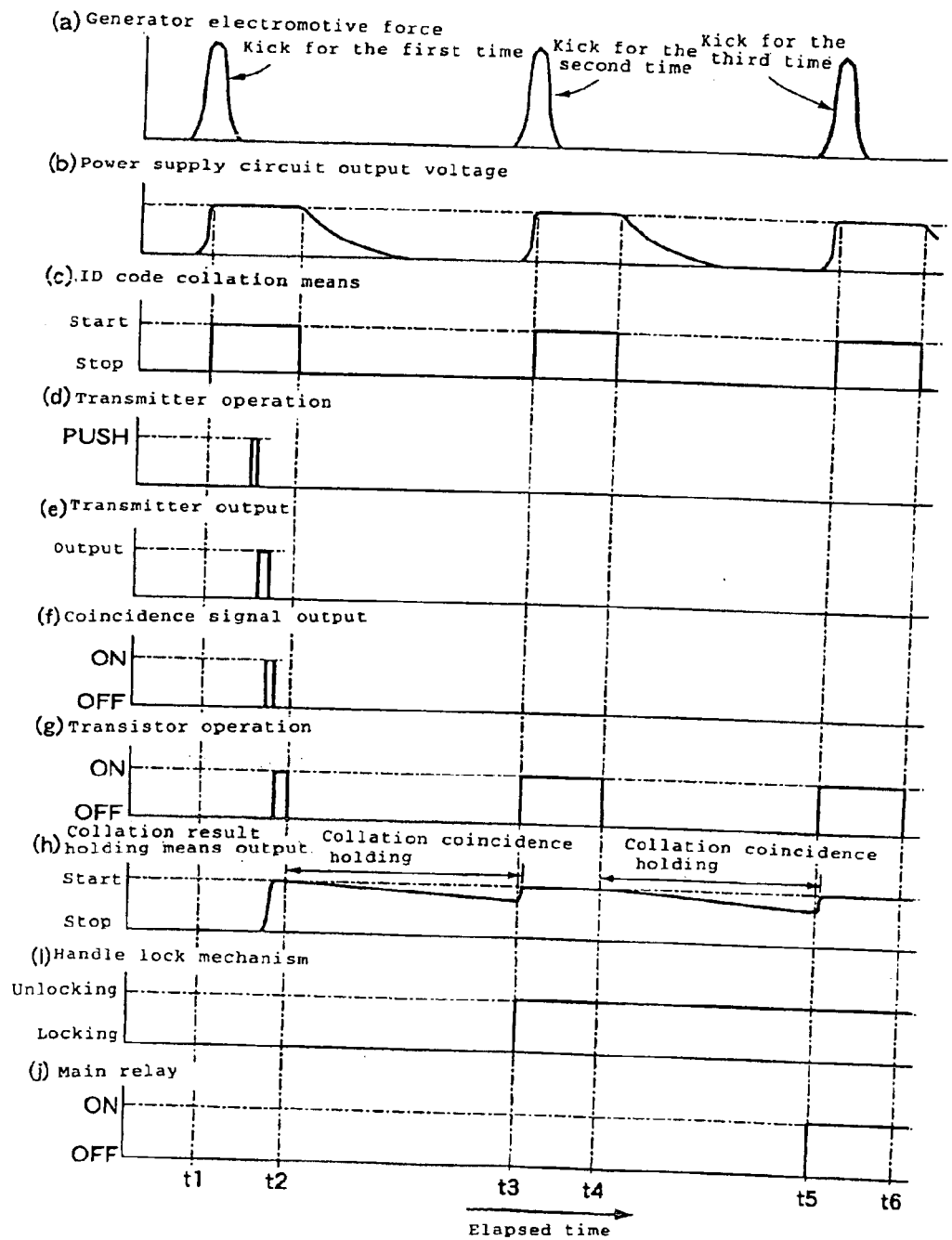
FIG. 3 is a timing chart of the remote lock control apparatus.

FIGS. 1 to 3 show a working example of the present invention, and FIG. 1 is a side elevational view of a scooter, FIG. 2 is a circuit block diagram showing a configuration of a remote lock control apparatus, and FIG. 3 is a timing chart of the remote lock control apparatus.

First, referring to FIG. 1, a step ST for receiving the feet of the driver placed thereon is disposed between front and rear wheels WF and WR of a scooter V as a small vehicle. A seat S on which the driver should be seated is disposed at an upper portion of a rear body cover FR made of metal or synthetic resin which is erected uprightly from a rear end of the step ST. A baggage accommodating seat box (not shown) is disposed in the rear body cover FR, and the seat S is mounted on the seat box, such that the seat S can be pivoted between a closing position at which the seat S covers an upper open face of the seat box and an opening position.

The front wheel WF is supported for rotation by a front fork 5, and a steering handle H in the form of a bar is connected to the front fork 5 by a steering shaft (not shown). The steering shaft is covered with a front body cover FF made of metal or synthetic resin which extends from a front end of the step ST, such that it is erected rearwardly upwardly. Further, the steering shaft is supported for steering operation by a head pile (not shown) of a front body frame.

At a rear portion of the body frame, a power unit P including an engine E and a speed change gear M is supported for rocking motion. The rear wheel WR is supported for rotation at a rear portion of the power unit P. Further, a kick starting mechanism 7 is provided, which can drive a generator G (refer to FIG. 2) included in the power unit P by a kicking operation of a kick pedal 6.

Referring to FIG. 2, a battery B is carried on the scooter V, and a charging coil 8 of the generator G is connected to the positive terminal of the battery B through a voltage regulator 9. Thus, power outputted from the charging coil 8 of the generator G, by performing a kicking operation of the kick pedal 6 of the kick starting mechanism 7, is regulated in voltage and rectified into direct current by the voltage regulator 9. The power is then applied to the battery B, so that the battery B is charged. Further, ignition power is supplied from an ignition circuit 11 to an ignition plug 10 provided in the engine E.

A control module 13 is accommodated and disposed, for example, in the front body cover FF. The control unit is capable of canceling a locked state of the steering handle H and enabling ignition of the ignition plug 10, in response to transmission of a signal including a normal ID code from a portable transmitter 12, for example, of the infrared type.

Control module 13 includes a main relay 14 provided between the battery B and the ignition circuit 11, main relay driving means 16, capable of changing over between on and off of the main relay 14 in a conducting state of a main switch 15 which can be rendered conducting in response to an operation of the driver. Control module 13 also includes an actuator 18 for changing over between locking and unlocking states of the handle locking mechanism 17 for locking the steering handle H in order to disable running of the vehicle, actuator driving means 19 for driving the actuator 18 in a conducting state of the main switch 15, a receiver 20 for receiving a signal transmitted from the portable transmitter 12, ID code collation means 21 capable of collating an ID code received by the receiver 20 and a predetermined ID code and controlling operation of the main relay driving means 16 and the actuator driving means 19 in response to a result of the collation, a power supply circuit 22 connected to the battery B and the generator G for allowing storage of electromotive force generated by the generator G in response to operation of the kick starting mechanism 7 and connected to the ID code collation means 21 for supplying the stored power to the ID code collation means 21, and collation result holding means 23 connected to the power supply circuit 22 and the ID code collation means 21.

In the control module 13, the power supply circuit 22 has a terminal 24 connected the positive terminal of the battery B and the voltage regulator 9 and another terminal 25 connected to the ignition circuit 11. The main relay 14 is provided between the terminals 24 and 25, and the main switch 15 is provided between the terminal 24 and the main relay driving means 16 and actuator driving means 19.

The power supply circuit 22 is connected to the terminal 24 and includes a diode 26, a pair of smoothing capacitors 27 and 28 and a constant voltage IC 29. The power supply circuit 22 can store electromotive force generated by the generator G in response to operation of the kick starting mechanism 7.

The collation result holding means 23 includes a resistor 30 connected to the power supply circuit 22, an NPN transistor 31 connected in series to the resistor 30, and a resistor 32 provided between the base of the NPN transistor 31 and the ID code collation means 21. Also included are a smoothing capacitor 33 provided between the NPN transistor 31 and the ground, a resistor 34 provided between the node between the NPN transistor 31 and the smoothing capacitor 33 and the ID code collation means 21, and a Zener diode 35 and a resistor 36 connected in parallel to the smoothing capacitor 33.

Thus, in the collation result holding means 23, while power is supplied from the power supply circuit 22, the NPN transistor 31 exhibits a conducting state in response to inputting of a signal of the high level from the ID code collation means 21 to the base of the NPN transistor 31. This causes electricity to be stored in the smoothing capacitor 33. Then, after the signal from the ID code collation means 21 inputted to the base of the NPN transistor 31 changes to the low level and the NPN transistor 31 is rendered non-conducting, a collation coincidence holding signal of the high level is generated. The collation coincidence holding signal continues only for a preset time (several seconds) which depends upon a time constant, and is inputted from the node between the NPN transistor 31 and the smoothing capacitor 33 to the ID code collation means 21.

The ID code collation means 21 executes three steps in succession. The first step executed is the collating an ID code with the predetermined ID code in response to reception by the receiver 20 of a signal transmitted from the portable transmitter 12 within a period within which the ID code collation means 21 can operate in response to power supply from the power supply circuit 22 caused by driving of the generator G by the kick starting mechanism 7 for the first time and outputting, when the ID codes coincide with each other, a collation coincidence signal of the high level to the collation result holding means 23. Next, a second step is executed, providing a controlling operation of the actuator driving means 19 so that the handle lock mechanism 17 may be placed into the unlocking state in response to the power supply from the power supply circuit 22 caused by the driving of the generator G by the kick starting mechanism 7 for the second time while the collation coincidence holding signal of the high level continues to be outputted from the collation result holding means 23 and outputting a collation coincidence signal. Lastly, a third step is executed providing a controlling operation of the main relay driving means 16 so that the main relay 14 may be placed into an on state in response to the power supply from the power supply circuit 22 caused by the driving of the generator G by the kick starting mechanism 7 for the third time while the collation coincidence holding signal of the high level continues to be outputted from the collation result holding means 23.

Next, the operation of the present working example is described with reference to FIG. 3. In response to generation of electromotive force as shown in (a) of FIG. 3 from the generator G by driving the generator G by means of the kick starting mechanism 7 for the first time when the battery is in a battery consumption state, such a voltage as shown in (b) of FIG. 3 is outputted from the power supply circuit 22, and in response to the voltage. This causes the ID code collation means 21 to exhibit an operation enabled state only for a period of time from time t1 to time t2 as shown in (c) of FIG. 3. When the portable transmitter 12 is operated as shown in (d) of FIG. 3 and a signal is outputted from the portable transmitter 12 as shown in (e) of FIG. 3 when the ID code collation means 21 is in such an operation enabled state as described above, the ID code collation means 21 collates, in response to reception of the signal from the portable transmitter 12 by the receiver 20, whether or not the ID code received coincides with the predetermined ID code. If the received ID code coincides with the predetermined ID code, then the ID code collation means 21 outputs a collation coincidence signal of the high level as shown in (f) of FIG. 3.

The collation coincidence signal of the high level from the ID code collation means 21 is inputted to the base of the NPN transistor 31 provided in the collation result holding means 23. The NPN transistor 31 exhibits a conducting stage only for a period of time after the inputting of the collation coincidence signal of the high level is started until time t2 (the time at which the operation of the ID code collation means 21 stops) as shown in (g) of FIG. 3, so that electricity is stored in the smoothing capacitor 33.

Thus, a collation coincidence holding signal, voltage level of which gradually drops as a result of discharge through the resistor 36, is outputted from the collation result holding means 23, as shown in (h) of FIG. 3. The collation coincidence holding signal is inputted to the ID code collation means 21.

If driving of the generator G by the kick starting mechanism 7 for the second time is performed before the collation coincidence holding signal outputted from the collation result holding means 23 has dropped to a level determined to be low (that is, before the preset time set by the collation result holding means 23 elapses), then the ID code collation means 21 exhibits an operating state for a period of time from time t3 to time t4 as shown in (c) of FIG. 3.

Thus, when power is supplied from the power supply circuit 22 by the driving of the generator G by the kick starting mechanism 7 for the second time, the ID code collation means 21 controls the actuator driving means 19 so that the handle lock mechanism 17 is placed into an unlocking state and outputs a collation coincidence signal, as shown in (i) of FIG. 3. After time t3, the handle lock mechanism 17 is placed into an unlocking state, and the NPN transistor 31 of the collation result holding means 23 exhibits a conducting state from time t3 to time t4 as shown in (g) of FIG. 3.

Further, if driving of the generator G by the kick starting mechanism 7 for the third time is performed before the collation coincidence holding signal outputted from the collation result holding means 23 has dropped after time t4 to a level determined to be low (that is, before the preset time set by the collation result holding means 23 elapses), then the ID code collation means 21 exhibits an operating state for a period of time from time t5 to time t6, as shown in (c) of FIG. 3. In response to this, the NPN transistor 31 of the collation result holding means 23 exhibits a conducting state from time t5 to time t6 as shown in (g) of FIG. 3.

Further, when power is supplied from the power supply circuit 22, as a result of the driving of the generator G by the kick starting mechanism 7 for the third time, the ID code collation means 21 controls the main relay driving means 16 so that the main relay 14 may be placed into an on state as shown in (j) of FIG. 3. After time t6, the main relay 14 is placed into an on state.

Accordingly, even if battery is fully consumed, if the kick starting operation is performed successively within a comparatively short time corresponding to the preset time in the collation result holding means 23, then the locked state of the steering handle H is canceled, and the engine can be started as a result of the ignition circuit 11 being energized.

While a working example of the present invention is described above, the present invention is not limited to the working example described above and various design alterations are possible without departing from the present invention set forth in the claim.

For example, while, in the example described above, a locking mechanism for disabling running of a vehicle is the handle lock mechanism 17, the locking mechanism may also be a main stand lock mechanism, or locking and unlocking of both of the handle lock mechanism 17 and the main stand lock mechanism. Any of these various locking mechanisms may be controlled in response to transmission of an ID code from the portable transmitter 12.

As described above, according to the present invention, even if battery power has been consumed, if operation of the kick starting mechanism is successively performed three times within a comparatively short period of time corresponding to a preset time in the collation result holding means, then the locking mechanism can be unlocked and the engine can be started as a result of the ignition circuit being energized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A remote lock control apparatus for a small vehicle, comprising:
   a generator capable of charging a battery;
   a kick starting mechanism capable of driving said generator; and
   a control module capable of receiving power from the generator driven by successive kick start operations of the kick starting mechanism, and during the successive kick start operations, the control module performs a first step of collating a received ID code received from a portable transmitter with a predetermined ID code in the control module and generating an coincidence signal when the received and the predetermined ID codes match, a second step of unlocking a locking mechanism disposed on the vehicle, a third step of sending a signal placing an ignition placing in an on state, the control module including:
   ID code collation means operable in response to supply of power from said power supply circuit for executing collation of the received ID code received by said receiver and a predetermined ID code and executing operation control of said main relay driving means and said actuator driving means in response to a result of the collation and outputting of a collation coincidence signal when the ID codes coincide with each other; and
   collation result holding means connected to said power supply circuit and said ID code collation means and capable of outputting a collation coincidence holding signal in response to outputting of the collation coincidence signal of said ID code collation means so as to continue for a preset time after stopping of the outputting of the collation coincidence signal of said ID code collation means caused by stopping of the power supply from said power supply circuit.

2. The remote lock control apparatus for a small vehicle according to claim 1, the control module further comprising:
   main relay driving means capable of changing over between on and off of a main relay provided between an ignition circuit of an engine and said battery;
   actuator driving means for driving an actuator for changing over between locking and unlocking states of a locking mechanism for disabling running of said vehicle;
   a receiver for receiving a signal including an ID code and transmitted from a portable transmitter; and
   a power supply circuit connected to said battery and said generator for allowing charging with electromotive force generated by said generator in response to operation of said kick starting mechanism.

3. The remote lock control apparatus for a small vehicle according to claim 2,
   the collation result holding means comprising a first resistor connected to the power supply circuit, an NPN transistor connected in series to the resistor, a resistor provided between the base of the NPN transistor and the ID code collation means, a smoothing capacitor provided between the NPN transistor and a ground, a second resistor provided between the node between the NPN transistor and the smoothing capacitor and the ID code collation means, and a diode and a third resistor connected in parallel to the smoothing capacitor.

4. The remote lock control apparatus for a small vehicle according to claim 2, wherein
   said ID code collation means successively executes
   a first step of performing collation of the ID codes in response to reception by said receiver of a signal from said portable transmitter within an operation enabled period of said ID code collation means in response to the power supply from said power supply circuit caused by driving of said generator by said kick starting mechanism for the first time and outputting, when the ID codes coincide with each other, a collation coincidence signal to said collation result holding means,
   a second step of controlling operation of said actuator driving means so that said locking mechanism may be placed into the unlocking state in response to the power supply from said power supply circuit caused by the driving of said generator by said kick starting mechanism for the second time while the collation coincidence holding signal continues to be outputted from said collation result holding means and outputting a collation coincidence signal, and
   a third step of controlling operation of said main relay driving means so that said main relay may be placed into an on state in response to the power supply from said power supply circuit caused by the driving of said generator by said kick starting mechanism for the third time while the collation coincidence holding signal continues to be outputted from said collation result holding means.

5. A remote lock control apparatus for a small vehicle, comprising:
   a generator capable of charging a battery;
   a kick starting mechanism capable of driving said generator;
   main relay driving means capable of changing over between on and off of a main relay provided between an ignition circuit of an engine and said battery;
   actuator driving means for driving an actuator for changing over between locking and unlocking states of a locking mechanism for disabling running of said vehicle;
   a receiver for receiving a signal including an ID code and transmitted from a portable transmitter;

a power supply circuit connected to said battery and said generator for allowing charging with electromotive force generated by said generator in response to operation of said kick starting mechanism;

ID code collation means operable in response to supply of power from said power supply circuit for executing collation of the received ID code received by said receiver and a predetermined ID code and executing operation control of said main relay driving means and said actuator driving means in response to a result of the collation and outputting of a collation coincidence signal when the ID codes coincide with each other; and collation result holding means connected to said power supply circuit and said ID code collation means and capable of outputting a collation coincidence holding signal in response to outputting of the collation coincidence signal of said ID code collation means so as to continue for a preset time after stopping of the outputting of the collation coincidence signal of said ID code collation means caused by stopping of the power supply from said power supply circuit.

6. The remote lock control apparatus for a small vehicle according to claim 5, the collation result holding means comprising a first resistor connected to the power supply circuit, an NPN transistor connected in series to the resistor, a resistor provided between the base of the NPN transistor and the ID code collation means, a smoothing capacitor provided between the NPN transistor and a ground, a second resistor provided between the node between the NPN transistor and the smoothing capacitor and the ID code collation means, and a diode and a third resistor connected in parallel to the smoothing capacitor.

7. The remote lock control apparatus for a small vehicle according to claim 5, wherein said ID code collation means successively executes a first step of performing collation of the ID codes in response to reception by said receiver of a signal from said portable transmitter within an operation enabled period of said ID code collation means in response to the power supply from said power supply circuit caused by driving of said generator by said kick starting mechanism for the first time and outputting, when the ID codes coincide with each other, a collation coincidence signal to said collation result holding means, a second step of controlling operation of said actuator driving means so that said locking mechanism may be placed into the unlocking state in response to the power supply from said power supply circuit caused by the driving of said generator by said kick starting mechanism for the second time while the collation coincidence holding signal continues to be outputted from said collation result holding means and outputting a collation coincidence signal, and a third step of controlling operation of said main relay driving means so that said main relay may be placed into an on state in response to the power supply from said power supply circuit caused by the driving of said generator by said kick starting mechanism for the third time while the collation coincidence holding signal continues to be outputted from said collation result holding means.

8. A method for controlling a locking mechanism of a small vehicle by remote lock control apparatus, comprising the steps of:

performing a first kick start operation on a kick starting mechanism of the vehicle capable of driving a generator capable of charging a battery and supplying power from the generator to a control module;

collating a received ID code received by the control module from the remote control apparatus with a predetermined ID code in the control module;

generating an coincidence signal in the control module when the received and the predetermined ID codes match;

performing a second kick start operation on the kick starting mechanism;

performing an operation of the control module for unlocking said locking mechanism;

performing a third kick start operation;

sending a signal from the control module for placing an ignition circuit in an on state.

9. The method for controlling a locking mechanism of a small vehicle by remote lock control apparatus according to claim 8, the control module comprising:

main relay driving means capable of changing over between on and off of a main relay provided between an ignition circuit of an engine and said battery;

actuator driving means for driving an actuator for changing over between locking and unlocking states of a locking mechanism for disabling running of said vehicle;

a receiver for receiving a signal including an ID code and transmitted from a portable transmitter;

a power supply circuit connected to said battery and said generator for allowing charging with electromotive force generated by said generator in response to operation of said kick starting mechanism;

ID code collation means operable in response to supply of power from said power supply circuit for executing collation of the received ID code received by said receiver and a predetermined ID code and executing operation control of said main relay driving means and said actuator driving means in response to a result of the collation and outputting of a collation coincidence signal when the ID codes coincide with each other; and collation result holding means connected to said power supply circuit and said ID code collation means and capable of outputting a collation coincidence holding signal in response to outputting of the collation coincidence signal of said ID code collation means so as to continue for a preset time after stopping of the outputting of the collation coincidence signal of said ID code collation means caused by stopping of the power supply from said power supply circuit.

10. The remote lock control apparatus for a small vehicle according to claim 9, the collation result holding means comprising a first resistor connected to the power supply circuit, an NPN transistor connected in series to the resistor, a resistor provided between the base of the NPN transistor and the ID code collation means, a smoothing capacitor provided between the NPN transistor and a ground, a second resistor provided between the node between the NPN transistor and the smoothing capacitor and the ID code collation means, and a diode and a third resistor connected in parallel to the smoothing capacitor.

11. The method for controlling a locking mechanism of a small vehicle by remote lock control apparatus according to claim 9, wherein said ID code collation means successively executes a first step of performing collation of the ID codes in response to reception by said receiver of a signal from said portable transmitter within an operation enabled period of said ID code collation means in response to the power supply from said power supply circuit caused by driving of said generator by said kick starting mechanism for the first time and outputting, when the ID codes coincide with each other, a collation coincidence signal to said collation result holding means, a second step of controlling operation of said actuator driving means so that said locking mechanism may be placed into the unlocking state in response to the power supply from said power supply circuit caused by the driving of said generator by said kick starting mechanism for the second time while the collation coincidence holding signal continues to be outputted from said collation result holding means and outputting a collation coincidence signal, and a third step of controlling operation of said main relay driving means so that said main relay may be placed into an on state in response to the power supply from said power supply circuit caused by the driving of said generator by said kick starting mechanism for the third time while the collation coincidence holding signal continues to be outputted from said collation result holding means.

* * * * *